United States Patent Office 2,884,342
Patented Apr. 28, 1959

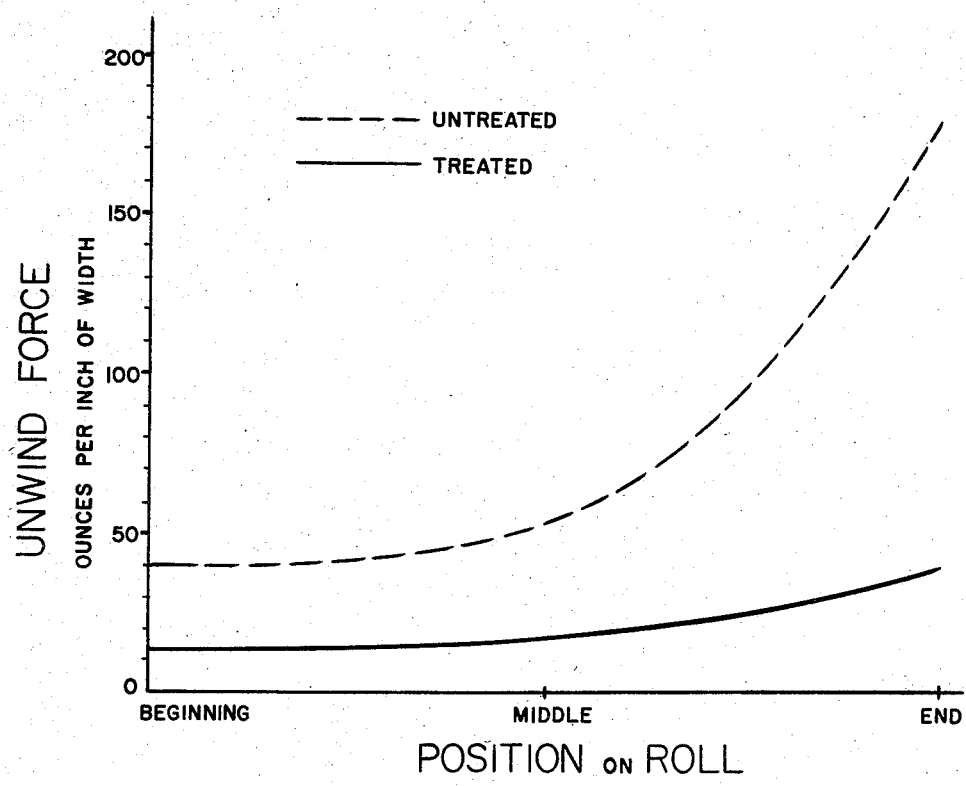
INVENTOR.
ERNST A. WOLFF

2,884,342

PRESSURE SENSITIVE ADHESIVE SHEET MATERIAL

Ernst A. Wolff, Chicago, Ill., assignor to The Kendall Company, Boston, Mass., a corporation of Massachusetts Application April 2, 1956, Serial No. 575,557

11 Claims. (Cl. 117—122)

This invention relates to adhesive sheet materials, and more particularly to improved pressure-sensitive adhesive tapes of the type comprising a fabric backing material having a pressure-sensitive adhesive mass applied to one side thereof.

In manufacturing adhesive tape suitable for conventional end uses, for example in surgical and industrial fields, various properties of the tape must be taken into consideration, including for example, adhesive properties of the tape, which are usually measured in terms of tack, adhesion, and creep resistance, and tensile properties, which are determined in terms of tensile strength and tear resistance. The property of tear resistance is particularly important in surgical fabric-backed tape, which is dispensed by hand in large amounts, as for example in hospitals or for athletic purposes. In such instances the tape should have sufficiently high tear to stand the stress and strain of ordinary use, but should have sufficiently low tear so that the fabric-backed tape can be easily dispensed by tearing it across the warp threads.

Prior to this invention low tear was obtained in adhesive tape by stiffening the fabric backing with small amounts of starch. Finishing with starch, however, tended to cause so-called wet-delamination of the adhesive mass from the backing. For example, when conventional adhesive tape becomes wet, the backing tends to separate from the adhesive mass. In such case, the mass continues to adhere to the skin, and can only be removed by means of organic solvents.

It is accordingly one of the important objects of this invention to provide an adhesive sheet material, more specifically in the form of adhesive tape, which has the combined properties of proper tensile strength and low tear resistance and which at the same time displays reduced fiber swellability and is therefore substantially free of any tendency toward delamination when it is exposed to washing or other wetting.

In addition to the problem of excessive tear resistance and wet delamination, there is also the problem of strong adhesion to the backing when the tape is wound into conventional roll form for sale or use. Certain adhesive masses have an especially high degree of adhesion to the backing; others develop it on aging; and in some instances the adhesion to the next convolution increases as the core or central portion of the roll is approached. In such case, excessive force is required to unwind the tape at the time of use, which may cause delay during an emergency and is in general undesirable.

It is a further important object of the invention to provide a pressure-sensitive adhesive sheet or tape, which can be readily unwound, even after long storage or aging, and which has this property of easy unwind uniformly throughout its length.

A further object of the invention is to provide a pressure-sensitive adhesive tape which is substantially free of the difficulties hereinbefore referred to and which has the combined properties of easy unwind and low tear resistance, while at the same time retaining the original properties of the adhesive mass and being substantially devoid of any tendency toward wet-delamination.

Further objects and advantages of the invention will become apparent from the following description and appended claims.

The finished sheet material or tape of the present invention in general comprises a fabric backing which is impregnated with a mixture of resinous materials and has a layer of adhesive material applied to one side. The resin mixture in the fabric is essentially a mixture of a thermosetting resin such as the amino-aldehyde resins, and a thermoplastic resin, including preferably polymers or co-polymers of vinyl acetate and vinyl chloride. When applying the resinous mixture to the fabric, the aminoaldehyde constituents are in the monomeric state or in the low condensation stage, while the thermoplastic constituents are substantially fully polymerized. The resinous mixture is applied to the fabric following the regular wet pretreatment which usually consists of singeing, desizing, alkaline scouring, and in some instances bleaching or dyeing. This preliminary treatment normally prepares the fabric for better anchorage of the adhesive mass by removing impurities and cotton waxes. It also renders the fabric suitably absorbent for the impregnation with the resin-forming materials.

The prefered amino-aldehyde monomers for treating the fabrics employed in accordance with this invention are water-soluble amino-aldehyde condensates. Since they are in the monomeric state, or in a stage of low condensation, the particles are of small molecular size and are capable of penetrating the cellulosic fibers. Suitable resin-forming compounds of this type include urea-aldehyde condensation products, specifically urea-formaldehyde condensates and melamine-aldehyde condensation products, including specifically melamine-formaldehyde condensates. The condensates may be used either in the form of methylol urea or methylol melamine, or in the substituted state, for example, methylated methylol melamine, and other alkylated derivatives.

The thermoplastic resins employed include polymers of vinyl acetate, vinyl chloride, ethyl acrylate, methyl methacrylate and ethyl methacrylate, and copolymers of vinyl chloride with vinyl acetate, vinylidine chloride and the like. The polyvinyl acetate resins may contain a small amount of hydroxyl groups.

The amino-aldehyde condensates are commercially available in aqueous solutions containing from 40 to 80% of solids. The thermoplastic resins are commercially available in the form of emulsion-polymerized dispersions having about 20 to 60% resin content. Before applying these finishing agents to the fabric, they are diluted with water to proper concentrations and mixed. In general, the concentration and pick-up is controlled in such a way as to incorporate in the fabric from 1 to 10% of the total resin mixture on the dry weight of the fabric.

In order to obtain uniform wetting and distribution of the resins on the fabric, it is desirable to add a small amount of wetting agent, preferably a non-ionic wetting agent, to the resin solution. Suitable non-ionic wetting agents include, for example, Triton-NE, which is a 30% water solution of an ethylene oxide condensation product with iso-octyl phenol, and Tween 20, which is an ethylene oxide condensation product with sorbitan monolaurate. In order to react and polymerize the urea-aldehyde monomers, it is essential to add a suitable amount of a catalyst to the solution capable of acid catalyzing the reaction at raised temperatures, including for example such catalysts as ammonium chloride and diammonium phosphate.

A preferred method of applying the resin is as follows: The mixture of monomer solution and resin dispersion is applied to the fabric in open width on conventional textile finishing equipment. Preferably, the cloth is first subjected to the usual wet pre-treatment and is then dried by passage over steam-heated drums, after which it is passed through a padder, into which the previously prepared resin mixture has been run. The saturated cloth is then passed through pneumatically controlled squeeze rolls to remove excess liquid. The pressure on these rolls, which can be closely controlled, determines the amount of wet pick-up and in turn the amount of resins and monomers absorbed by the fiber. The fabric is next dried on a tenter-frame, and then passed through a conventional curing oven which is kept at a sufficiently high temperature to effect curing and polymerization of the amino-aldehyde constituents. In order to remove unreacted chemicals from the fabric, it is then rinsed by a passage through water and again frame-dried, after which it is ready for the conventional application of the adhesive mass.

In general the preparation of the final adhesive tape from the impregnated fabrics prepared as described above is carried out by applying to one side of the treated fabric a suitable adhesive mass of conventional composition. This can be accomplished by calender spreading, solvent coating, or other suitable process.

A further understanding of the invention will be obtained from the following examples, in which methods of preparing the resin solutions and dispersions and applying them to the fabric are described in greater detail.

Example I

A resin-treating bath was first prepared in the following way: Twenty-four pounds of a 50% water solution of a modified urea-formaldehyde monomer, sold by the Rohm and Haas Company under the trade name Rhonite R-1, were first diluted with water to approximately 50 gallons. To this solution were added 18 pounds of a 50% emulsion of a polyvinyl acetate resin, sold by American Cyanamid Company under the trade name Aerotex 159, and 8 ounces of Triton-NE. Water was then added to this mixture until a total volume of 75 gallons had been reached. Shortly before the actual impregnation of the fabric, 10 ounces of diammonium phosphate were added, while the mixture was continuously and slowly stirred. The resulting impregnating liquid was then run from the mixing kettle into a padder.

An 80/72 print cloth was first subjected to the usual wet pre-treatment, after which it was dried and passed through the padder. Upon emerging from the impregnating liquid, the cloth was squeezed between rubber rolls in order to remove the excess liquid and at the same time insure the penetration of the finish into the fiber structure. The pressure on the rolls was pneumatically controlled and set in such a way as to allow a wet pick-up of between 65 and 75%. This resulted in a resin pick-up of 1.5 to 1.8% of the urea-formaldehyde monomer and 1.2 to 1.4% of the polyvinyl acetate resin. The treated fabric was then dried on a tenter-frame maintained at a temperature of 200 to 225° F., and then passed through a conventional curing oven, in which the cloth was exposed for several minutes to a temperature of 300 to 330° F. As a result, the urea-formaldehyde constituent polymerized and at the same time became permanently fixed within the fiber structure.

After the curing, the fabric was rinsed with water to remove any unreacted compounds. The excess water was removed by passing the fabric through pressure rolls, after which it was dried on a tenter-frame under usual conditions. The fabric was then ready for the application of the adhesive mass in the usual manner.

Example II

A resin-treating bath was prepared in the following way: Twenty pounds of an 80% water solution of modified melamine-formaldehyde monomer, sold by the American Cyanamid Company under the trade-name of Aerotex MW, were first diluted with water to about 50 gallons. To this solution were added 18 pounds of a 50% emulsion of a polyvinyl acetate resin, sold by the same company, under the trade-name of Aerotex 159, and 8 ounces of Triton NE. Water was then added to this mixture until a total volume of 75 gallons were obtained. Immediately before the actual impregnation of the fabric on the padder, 16 ounces of diammonium phosphate were added, while the mixture was continuously and slowly stirred. The resulting mixture was then run from the mixing kettle into the bowl of the finishing padder.

A 74/84 sheeting was processed in the same manner as described in Example I. This resulted in a resin pick-up of 1.5 to 1.8% of the melamine-formaldehyde monomer and 1.2 to 1.4% of the polyvinyl acetate resin. The treated fabric was then dried and cured in the manner described in Example I, as a result of which the melamine-formaldehyde polymerized and at the same time became permanently fixed within the fiber structure. After rinsing and drying, the fabric was then ready for the application of the adhesive mass.

Example III

Twenty-four pounds of a 50% water solution of a modified urea-formaldehyde monomer, sold under the tradename of Rhonite R-1 by the Rohm and Haas Company, were first diluted with water to approximately 50 gallons. To this solution were added 18 pounds of a 50% emulsion of a vinyl chloride-vinylidene chloride copolymer sold under the tradename Dow Latex 744-B by the Dow Chemical Company. Prior to the additional of the latex to the monomer solution, one and one-half pounds of Glyptal #2557, an alkyd-type plasticizer sold by the General Electric Company, were added to the latex in emulsified form, using Triton NE as the emulsifying agent, to obtain a softer and more flexible resin finish on the fabric. To this mixture, containing the urea-formaldehyde monomer and the plasticized vinylchloride-vinylidene chloride copolymer, were added 8 ounces of Triton NE, after which water was added until a total volume of 75 gallons had been obtained. Finally 10 ounces of diammonium phosphate were added, while the mixture was continuously and slowly stirred. The resulting impregnating liquid was then run from the mixing kettle into the bowl of a finishing padder.

A 44/44 sheeting was treated with the above liquid in the same manner as described in Example I, after which it was ready for the application of the adhesive mass.

In making the final adhesive tape any suitable pressure-sensitive adhesive mass is applied, for example by calender spreading, to either side of the coated fabrics prepared as described above. The following are typical examples of adhesive compositions suitable for this purpose, which may be compounded in the usual manner:

Example A

| | Parts by weight |
|---|---|
| Natural rubber (pale crepe) | 35 |
| Dihydro abietic acid | 15 |
| Hydrogenated ester gum | 15 |
| Zinc oxide | 25 |
| White clay | 5 |
| Lanolin (refined) | 1.5 |
| Paraffin wax (M.P. 125° C.) | 0.5 |
| Natural white ceresin wax | 1.0 |
| Reaction product of salicylaldehyde and propylene diamine | 0.5 |
| Reaction product of heptaldehyde and diphenylamine | 0.5 |
| 2-5 ditertiary amyl hydroquinone | 0.5 |

Example B

| | Parts by weight |
|---|---|
| Light reclaimed rubber | 32.1 |
| Smoked sheet natural rubber | 11.3 |
| Disproportionated rosin | 13.4 |
| Hydrogenated rosin | 11.7 |
| Zinc oxide | 16.8 |
| Clay | 9.4 |
| Antioxidants | .69 |
| Hydrocarbon liquid plasticizer | 3.8 |

Example C

| | |
|---|---|
| Rubbery polymer of ethyl acrylate, butyl acrylate and chloroethyl vinyl ether | 50.0 |
| Hydrogenated ester gum | 20.0 |
| Polyterpene resin | 5.0 |
| Condensation polymer of dihydric alcohol and dibasic acid | 10.0 |
| Tetraethylene glycol ester of 2-ethyl hexanoic acid | 2.0 |
| Precipitated silica | 10.0 |
| Alkylated polyhydroxy phenol | 3.0 |

Example D

| | |
|---|---|
| Polyethyl vinyl ether (high molecular weight) | 40.0 |
| Polyisobutyl vinyl ether | 25.0 |
| Polyethyl vinyl ether (low molecular weight) | 15.0 |
| Aluminum oxide | 15.0 |
| Pentaerythritol ester of hydrogenated rosin | 10.0 |
| Polyterpene resin | 5.0 |
| 2,5-ditertiary butyl-4-methyl phenol | 3.0 |

The performance of the tapes prepared from fabrics treated in accordance with this invention is markedly superior to that of tapes prepared by conventional methods with respect to the properties of unwind, tear resistance, and wet-delamination. This has been demonstrated by means of several test methods. In the case of unwind, the tests are carried out by measuring on an Instron electrical strain gauge the force, in ounces per inch of width of the tape, required to pull the tape off a roll of tape 10 yards long. This is measured at the beginning of the roll, at the middle of the roll, and at the end of the roll. The results on a large number of untreated tapes and tapes prepared as described in Example I is given in the graph shown in the appended drawing, in which it is brought out that untreated tapes require an unwind force of 40 to 180 ounces per inch of width, while the treated tapes required only 13 to 40 ounces per inch of width. Thus, regardless of the position on the roll, the treated tapes require much less force for unwinding than the untreated tapes.

In the case of tear resistance, the tests are carried out on an Elmendorf tear tester, which gives the results in grams of force required to tear the test sample. A comparison was made between the tear resistance of untreated 72/84 2.90 Meads cloth and resin-treated cloth of the same construction prepared as described in Example I. The average force required to tear the untreated samples was about 1400 grams, while the average force required to tear the treated samples was only about 1000 grams.

The wet-delamination tests were carried out by cutting tape into strips 8 to 9 inches long, applying them to a glass panel, and then immersing the panel in water. After a period of time the panel was removed from the water and the strips of tape were removed from the panel. This caused delamination of the adhesive mass from the fabric backing in each untreated tape strip. In the tape strips treated acording to the invention, however, no delamination took place. The untreated tape delaminated after from 5 to 10 minutes of immersion, whereas the treated tape did not delaminate after 24 hours of immersion. Similar results were obtained when treated and untreated tapes were wetted after application to human skin.

The samples of treated tape prepared and tested as described above were also observed and tested as to adhesive properties at intervals over a period of about 18 months, and found to retain fully the original properties of adhesion, tack, and creep resistance. This indicates that the impregnation of the fabric backing has no noticeable effect on the adhesive mass even after aging.

It is believed that the resins and resin formers applied to the fabric backing not only react with each other to a certain extent during the heating or curing step, but also partly react with the cellulosic material in the backing, thus further insuring a firm bond between the fibers and the impregnating substances. Although reference has been made herein primarily to woven cotton fabrics, it is possible to use other cellulosic materials, such as woven regenerated cellulosic fabrics, unsized paper and similar fibrous cellulosic material as the backing.

I claim:

1. An adhesive sheet material comprising a flexible sheet backing having a layer of pressure-sensitive adhesive adherent to one side thereof, said backing being impregnated with a mixture of a cured amino-aldehyde condensation product and a vinyl resin, said condensation product having been cured in admixture with the vinyl resin while impregnated in the backing.

2. An adhesive sheet material comprising a flexible, cellulosic fabric backing having a layer of pressure-sensitive adhesive adherent to one side thereof, said backing being impregnated with a mixture of a cured amino-aldehyde condensation product and a vinyl resin, said condensation product having been cured in admixture with the vinyl resin while impregnated in the backing.

3. A pressure-sensitive adhesive tape substantially free from adhesive delamination in the presence of water comprising a cellulosic fabric backing having a layer of a pressure-sensitive adhesive adherent to one side thereof, said backing being impregnated with a mixture of a cured amino-aldehyde condensation product and a thermoplastic resin selected from the group consisting of vinyl acetate polymers and copolymers, vinyl chloride polymers and copolymers, and polymers of alkyl esters of acrylic and alkyl-substituted acrylic acids, said amino-aldehyde product having been cured in admixture with the vinyl resin while impregnated in the backing.

4. A pressure-sensitive adhesive tape, substantially as described in claim 3, wherein the condensation product is a condensation product of melamine and an aldehyde, and said resin is polyvinyl acetate.

5. A pressure-sensitive adhesive tape substantially as described in claim 3, wherein the condensation product is a condensation product of urea and an aldehyde, and said substance is polyvinyl acetate.

6. A pressure-sensitive adhesive tape, substantially as described in claim 3, wherein the said condensation product is a condensation product of urea and an aldehyde, and said resin is a copolymer of vinyl chloride and vinylidine chloride.

7. A pressure-sensitive adhesive tape, substantially as described in claim 4, wherein the aldehyde is formaldehyde.

8. A pressure-sensitive adhesive tape, substantially as described in claim 5, wherein the aldehyde is formaldehyde.

9. A pressure-sensitive adhesive tape, substantially as described in claim 6, wherein the aldehyde is formaldehyde.

10. A pressure-sensitive adhesive tape substantially free from adhesive delamination in the presence of water comprising a cellulosic fabric backing having a layer of pressure-sensitive adhesive adherent to one side thereof, said backing being impregnated with a mixture of a cured melamine-formaldehyde condensation product and a polyvinyl acetate compound, said condensation product being applied to said fabric in its uncured state in the form of an aqueous solution, said polyvinyl acetate compound being applied in the form of an emulsion-polymerized dispersion, said condensation product having been cured in admixture with said compound while impregnated in the backing.

11. A pressure-sensitive adhesive tape substantially free from adhesive delamination in the presence of water comprising a cellulosic fabric backing having a layer of pressure-sensitive adhesive adherent to one side thereof, said backing being impregnated with a mixture of a cured urea-formaldehyde condensation product and a polyvinyl acetate compound, said condensation product being applied to said fabric in its uncured state in the form of an aqueous solution, said polyvinyl acetate compound being applied in the form of an emulsion-polymerized dispersion, said condensation product having been cured in admixture with said compound while impregnated in the backing.

References Cited in the file of this patent

UNITED STATES PATENTS

| | | |
|---|---|---|
| 2,243,560 | Hall | May 27, 1941 |
| 2,423,428 | Pollard | July 1, 1947 |
| 2,548,980 | Kellgren | Apr. 17, 1951 |
| 2,631,947 | Kline | Mar. 17, 1953 |
| 2,728,688 | Wellisch | Dec. 27, 1955 |
| 2,730,459 | Holmen | Jan. 10, 1956 |
| 2,733,169 | Holmen | Jan. 31, 1956 |

UNITED STATES PATENT OFFICE
CERTIFICATE OF CORRECTION

April 28, 1959

Patent No. 2,884,342

Ernst A. Wolff

It is hereby certified that error appears in the printed specification of the above numbered patent requiring correction and that the said Letters Patent should read as corrected below.

Column 2, line 18, for "aminoaldehyde" read -- amino-aldehyde --; column 4, line 37, for "additional" read -- addition --; column 6, line 50, strike out "substance" and insert -- resin --.

Signed and sealed this 8th day of September 1959.

(SEAL)
Attest:

KARL H. AXLINE
Attesting Officer

ROBERT C. WATSON
Commissioner of Patents